(12) United States Patent
Cavin et al.

(10) Patent No.: US 10,963,046 B1
(45) Date of Patent: Mar. 30, 2021

(54) DRIFT CORRECTED EYE TRACKING

(71) Applicant: Facebook Technologies, LLC, Menlo Park, CA (US)

(72) Inventors: Robert Dale Cavin, Kirkland, WA (US); Alexander Jobe Fix, Seattle, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/982,896

(22) Filed: May 17, 2018

(51) Int. Cl.
*G06F 3/01* (2006.01)

(52) U.S. Cl.
CPC .................................. *G06F 3/013* (2013.01)

(58) Field of Classification Search
None
See application file for complete search history.

(56) References Cited

U.S. PATENT DOCUMENTS

| | | | |
|---|---|---|---|
| 5,949,520 A | 9/1999 | Heacock | |
| 5,997,141 A | 12/1999 | Heacock | |
| 6,741,359 B2 | 5/2004 | Wei et al. | |
| 7,474,407 B2 | 1/2009 | Gutin | |
| 7,505,142 B2 | 3/2009 | Knighton et al. | |
| 7,513,619 B2 | 4/2009 | Lacombe et al. | |
| 8,356,900 B2 | 1/2013 | Zhou et al. | |
| 8,394,084 B2 | 3/2013 | Palankar et al. | |
| 8,416,276 B2 | 4/2013 | Kroll et al. | |
| 8,416,479 B2 | 4/2013 | Kroll et al. | |
| 8,678,591 B2 | 3/2014 | Zhou et al. | |
| 8,834,565 B2 | 9/2014 | Nun | |
| 8,919,957 B2 | 12/2014 | Zhou et al. | |
| 8,939,583 B2 | 1/2015 | Borycki et al. | |
| 8,958,137 B2 | 2/2015 | Haussler | |
| 8,970,847 B2 | 3/2015 | Ono | |
| 9,101,292 B2 | 8/2015 | Zhou et al. | |
| 9,198,573 B2 | 12/2015 | Raymond et al. | |
| 9,211,062 B2 | 12/2015 | Sakagawa et al. | |
| 2003/0053219 A1 | 3/2003 | Manzi | |
| 2010/0118117 A1 | 5/2010 | Kroll et al. | |
| 2011/0149018 A1 | 6/2011 | Kroll | |
| 2013/0170004 A1 | 7/2013 | Futterer | |

(Continued)

OTHER PUBLICATIONS

United States Office Action, U.S. Appl. No. 15/593,555, dated Dec. 20, 2018. 47 pages.

(Continued)

*Primary Examiner* — Andre L Matthews
(74) *Attorney, Agent, or Firm* — Fenwick & West LLP

(57) ABSTRACT

A system tracks eye position using a first Optical Coherence Tomography (OCT) eye tracking unit to determine a first position of an eye of a user. The OCT eye tracking unit projects low coherence interference light onto a portion of the user's eye, and uses captured light reflected from the illuminated portion of the user's eye to generate a dataset describing the portion of the user's eye. The first position of the user's eye is determined based upon the generated dataset and a previously generated dataset. In order to minimize error and reduce the effects of draft, a reference tracking system is configured to determine a second position of the user's eye, which is used to update the determined first position of the user's eye.

19 Claims, 8 Drawing Sheets

(56) References Cited

U.S. PATENT DOCUMENTS

| | | |
|---|---|---|
| 2014/0028997 A1 | 1/2014 | Cable et al. |
| 2014/0055749 A1 | 2/2014 | Zhou et al. |
| 2014/0276361 A1 | 9/2014 | Herekar et al. |
| 2015/0032090 A1 | 1/2015 | Gonzalez |
| 2015/0208916 A1 | 7/2015 | Hayashi |
| 2015/0268399 A1 | 9/2015 | Futterer |
| 2015/0294468 A1 | 10/2015 | Shimizu et al. |
| 2015/0313466 A1 | 11/2015 | Yoshida |
| 2015/0313467 A1 | 11/2015 | Sakai et al. |
| 2016/0026253 A1 | 1/2016 | Bradski et al. |
| 2016/0077337 A1 | 3/2016 | Raffle et al. |
| 2016/0166143 A1* | 6/2016 | Goto ............... A61B 3/0025 351/206 |
| 2017/0000335 A1* | 1/2017 | Samec ............ G02B 27/0179 |
| 2018/0149874 A1* | 5/2018 | Aleem ............. G02B 26/101 |
| 2019/0183584 A1* | 6/2019 | Schneider ........... A61F 9/007 |

OTHER PUBLICATIONS

United States Office Action, U.S. Appl. No. 15/593,555, dated Jul. 1, 2019, 79 pages.

\* cited by examiner

DRIFT CORRECTED EYE TRACKING

BACKGROUND

The present disclosure generally relates to eye tracking, and specifically relates to drift correction for optical coherence eye tracking methods in artificial reality contexts.

Eye tracking systems are used in various artificial reality applications to provide a more immersive experience through correlation of the end-users gaze and attention. For example, a user may interact with an artificial reality application by focusing their gaze on different locations with the artificial reality application. The artificial reality application may perform different functions or display different content based upon the determined eye position of the user (e.g., the user may select a displayed virtual object by orienting their gaze towards the object).

SUMMARY

A system is configured to track eye position of a user of a head-mounted display (HMD). The HMD comprises an eye tracking system having an Optical Coherence Tomography (OCT) eye tracking unit and a reference tracking unit. The OCT eye tracking unit is configured to determine a first position of an eye of the user, and comprises an illumination source configured to project low coherence interference light onto a portion of the user's eye. The OCT eye tracking unit further comprises a detector configured to capture light reflected from the illuminated portion of the user's eye, and a controller configured to generate a dataset describing the portion of the user's eye based upon the captured light. The controller determines the first position of the user's eye based upon the generated dataset and a previously generated dataset of the portion of the user's eye.

The reference tracking system is configured to determine a second position of the user's eye. The controller is configured to update the first position of the user's eye determined using the OCT eye tracking unit with the second position determined using the reference tracking system. In some embodiments, the controller may also update a baseline model associated with the OCT eye tracking unit. In some embodiments, updating the first position may comprise replacing the first position with the second position, adjusting a value of the first position based upon a difference between the first and second positions, or generating a new first position based upon the updated baseline model.

In some embodiments, the reference tracking system comprises a camera imaging system configured to capture one or more images of the user's eye and to determine the second position based upon the one or more captured images. In some embodiments, the reference tracking system determines the second position based upon the one or more captured images based upon one or more glints in the captured images.

In some embodiments, the controller is configured to update the first position using the second position periodically. The OCT eye tracking unit may determine first positions of the user's eye at a first rate, while the reference tracking system is configured to determine second positions at a second rate that is slower than the first rate.

Because the OCT eye tracking unit determines the first position of the user's eye based upon previously determined eye positions, errors during the position determination process may carry over between consecutive determinations, causing the positions determined by the OCT eye tracking system to drift from the actual eye position. By updating (e.g., periodically) the first positions determined using the OCT eye tracking unit with the second position determined by the reference tracking system, an amount of error over time may be reduced.

Figure 1:
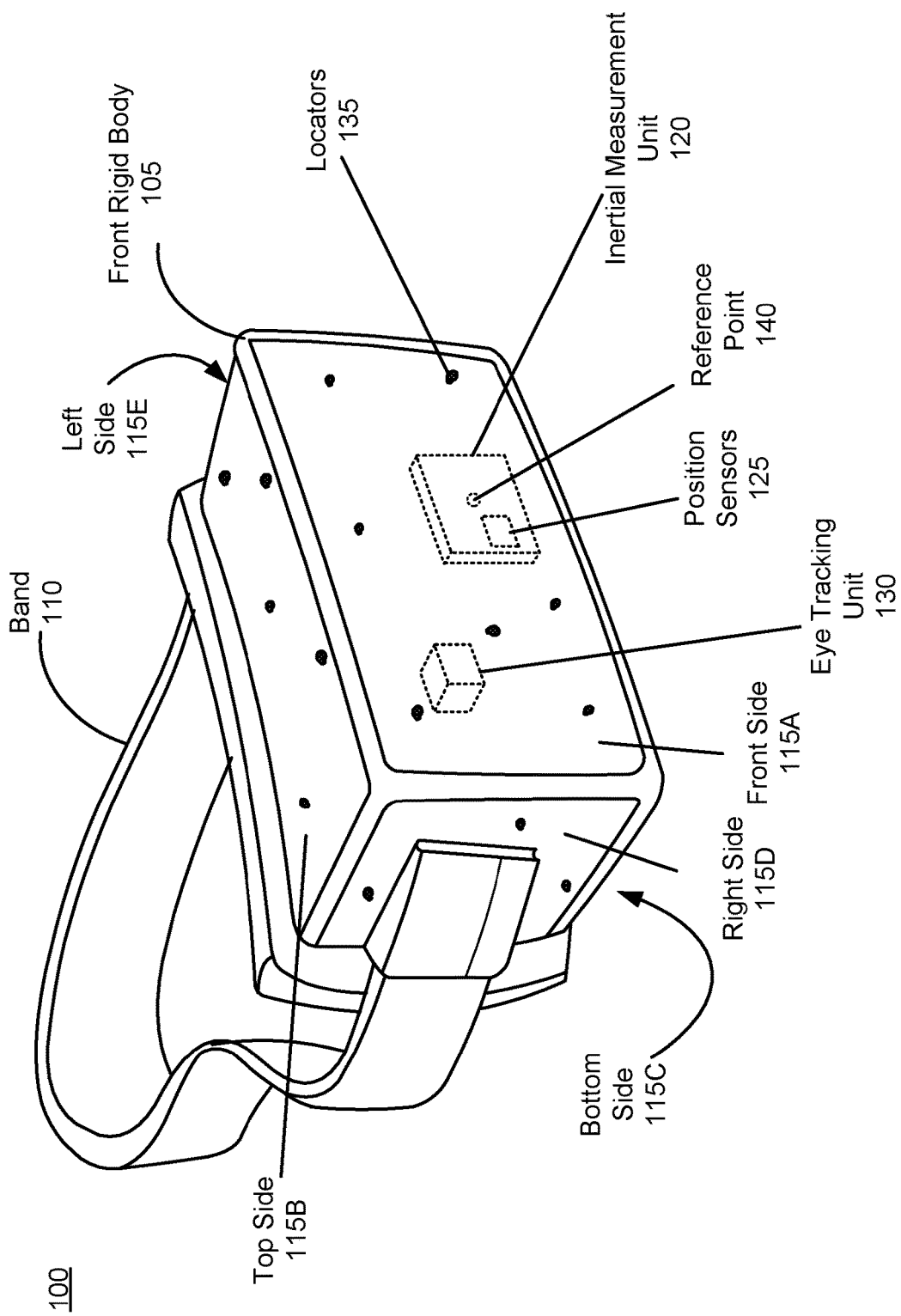
FIG. 1 is a diagram of an HMD, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

An MD system comprises an eye tracking system for tracking a position of a user's eye. The eye tracking system comprises a first eye tracking unit configured to determine the position of the user's eye based upon determined movement of the user's eye, and a second eye tracking unit (also referred to as a reference tracking system) configured to determine an absolute position of the user's eye.

In some embodiments, the first eye tracking unit in the HMD system comprises an Optical Coherence Tomography (OCT) eye tracking unit that measures apparent index change and scattering surfaces through a portion of a user's eye (e.g., a point, a line or a small area of sclera, cornea) using optical coherence techniques. The OCT eye tracking system includes an illumination source (e.g., a relatively low coherence light source) to project controlled coherence light onto a portion of the user's eye, a detector (e.g., photodetector) to collect backreflected (inclusive of any backscattered light) from the illuminated portion of the eye, and a reference system (e.g., a reference mirror) to configure a depth at which the illuminated portion of the eye is scanned. By measuring across multiple lateral positions, a 2-dimensional dataset of the eye is recorded (at a particular depth plane/region) and mapped to a position of the eye using a baseline model. The mapping may then be used to track the position of the eye as the user's gaze position changes. As an example, if the system captures a two dimensional (2D) data array at a set depth, the inherent features from the backreflection may be correlated to future captured datasets to determine to an X/Y-axis offset to increase correlation. This technique is sometimes referred to as digital image correlation or optical flow. In some embodiments, the OCT eye tracking unit may scan through multiple depths within a depth region to produce a 3-dimensional dataset of the eye, which may be used to calculate more accurate position or motion measurements. However, because the OCT eye tracking system determines eye position and updates the baseline model based upon the a determined offset or movement between different measurements, errors in position determination may accumulate over time, causing the determined position to drift away from the true position of the user's eye.

On the other hand, the reference tracking system may comprise an eye tracking camera system or other type of eye tracking system that determines an absolute position of the user's eye that is independent from previous eye position determinations. As such, the determined positions of the reference tracking system will not suffer from drift.

In some embodiments, the OCT eye tracking system may determine positions of the user's eye at a first rate, while the reference tracking system determines positions of the user's eye at a second rate that is slower than the first rate. The OCT eye tracking system may be used to track the position of the user's eye in substantially real time. On the other hand, in order to prevent the positions determined by the OCT eye tracking system from experiencing a significant amount of drift, positions determined using the reference tracking system are periodically used to update the positions determined by the OCT eye tracking system. As such, the error associated with the positions determined using the OCT eye tracking system can be minimized.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Example HMD Implementation

FIG. 1 is a diagram of an HMD 100, in accordance with an embodiment. The HMD 100 includes a front rigid body 105 and a band 110. The front rigid body 105 comprises a front side 115A, a top side 115B, a bottom side 115C, a right side 115D, and a left side 115E. The front rigid body 105 includes an electronic display element and an optics block (not shown in FIG. 1). In addition, the front rigid body 105 may comprise an IMU 120, one or more position sensors 125, an eye tracking unit 130, and locators 135. In the embodiment shown by FIG. 1, the position sensors 125 are located within the IMU 120, and neither the IMU 120 nor the position sensors 125 are visible to the user.

The locators 125 are located in fixed positions on the front rigid body 105 relative to one another and relative to a reference point 140. In the example of FIG. 1, the reference point 140 is located at the center of the IMU 120. The locators 125, or portions of the locators 125, are located on a front side 115A, a top side 115B, a bottom side 115C, a right side 115D, and a left side 115E of the front rigid body 105 in the example of FIG. 1. In some embodiments, each of the locators 125 emits light that is detectable by an imaging device (not shown) of an external console. By detecting the light emitted by the locators 125 using the imaging device, a position of the HMD 100 relative to the external console can be determined.

In the example of FIG. 1, the eye tracking unit 130 is not visible from outside of the HMD 100. The eye tracking unit 130 may or may not be in a line of sight of a user wearing the HMD 100. However, the eye tracking unit 130 is typically located (virtually through mirrors, etc., or in actuality) off-axis to avoid obstructing the user's view of the electronic display, although the eye tracking unit 130 can alternately be placed elsewhere. Also, in some embodiments, there is at least one eye tracking unit for the left eye of the user and at least one tracking unit for the right eye of the user. In some embodiments, only one eye tracking unit 130 can track both left and right eye of the user.

Figure 2:
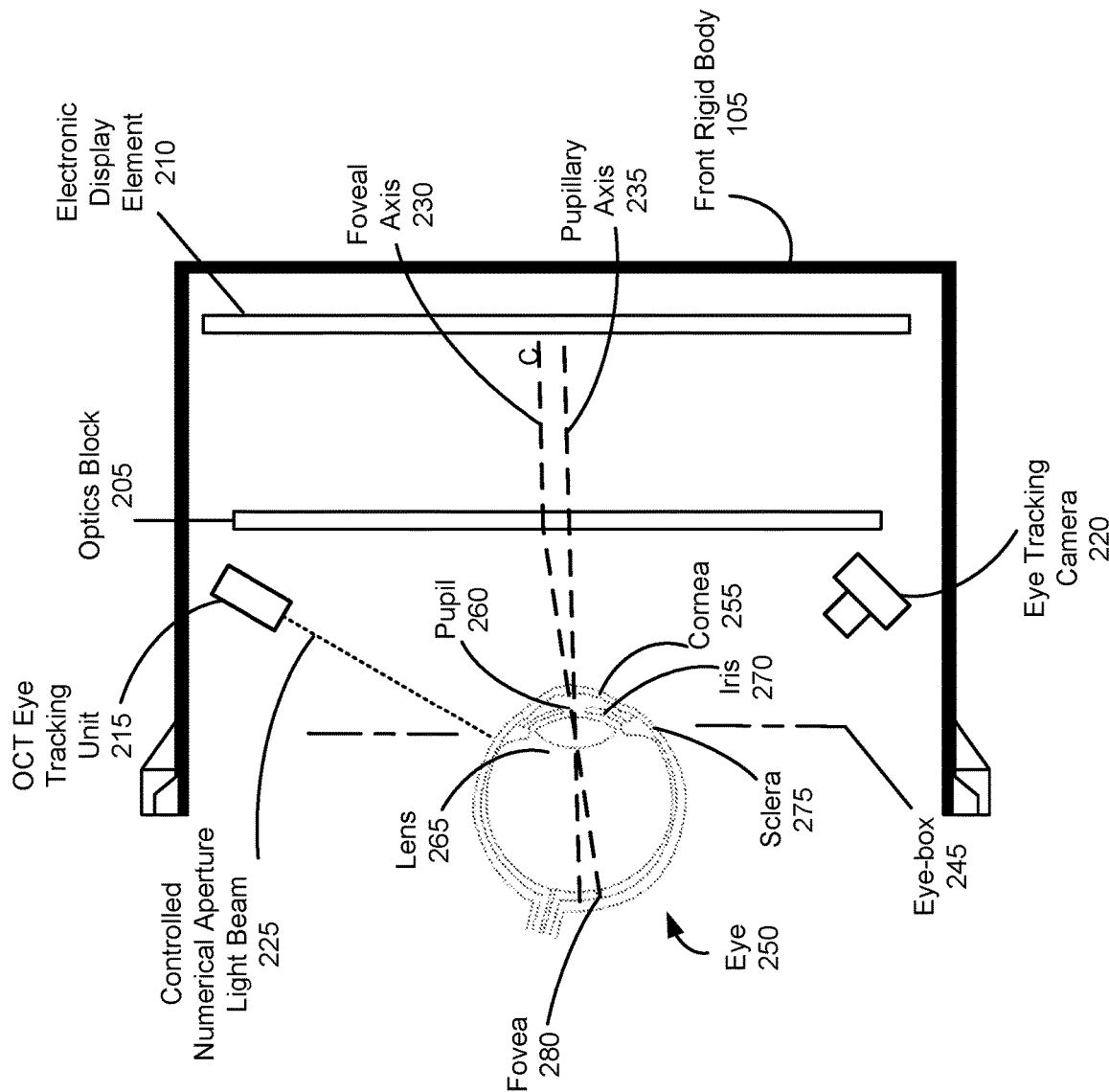
FIG. 2 is a cross-section view of a front rigid body of the HMD in FIG. 1, in accordance with an embodiment.

FIG. 2 is a cross section 200 of the front rigid body 105 of the embodiment of the HMD 100 shown in FIG. 1. As shown in FIG. 2, the front rigid body 105 of the HMD 100 contains an optics block 205, an electronic display element 210, and one or more eye tracking units (e.g., the OCT eye tracking unit 215 and the eye tracking camera 220). The electronic display element 210 emits image light toward the optics block 205. The optics block 205 magnifies the image light, and in some embodiments, also corrects for one or more additional optical errors (e.g., distortion, astigmatism, etc.). The optics block 205 directs the image light to an eye box 245 for presentation to the user. The eye box 245 is the location of the front rigid body 105 where a user's eye 250 is positioned.

For purposes of illustration, FIG. 2 shows a cross section 200 associated with a single eye 250. Accordingly, a separate optics block 205 and/or electronic display element 210 may be used to provide altered image light to other eye of the user. Similarly, separate eye tracking units may be used to track eye movement of the other eye of the user.

The eye 250 includes a cornea 255, a pupil 260, a lens 265, an iris 270, a sclera 275, and a fovea 280. The sclera 275 is the relatively opaque (usually visibly white) outer portion of the eye 250, which is often referred to as the "white of the eye." The cornea 255 is the curved surface covering the iris 270 and the pupil 260 of the eye 250. The cornea 255 is essentially transparent in the visible band (~380 nm to 750 nm) of the electromagnetic spectrum, and the near-infrared region (up to approximately 1,400 nm). The lens 265 is a transparent structure which serves to help focus light at the retina (the back of the eye 250). The iris 270 is a relatively thin, circular diaphragm concentric with (and defining) the pupil 260. The iris 270 is the colored portion of the eye 250 which contracts to alter the size of the pupil 260, a circular hole through which light enters the eye 250. The fovea 280 is illustrated as a small indent on the retina. The fovea 280 corresponds to the area of retina which has the highest visual acuity.

As used herein, the position of the eye 250 may refer to a spatial location of the eye 250 and/or an orientation or gaze direction of the eye 250. Eye movement may refer to a change in the position of the eye 250, such as a change in the gaze direction of the eye 250. Gaze direction is defined herein as the direction of a foveal axis 230, which is an axis that bisects a center of the fovea 280 and a center of the eye's pupil 260. Gaze direction corresponds to gaze position. In general, when a user's eyes look at a point, the foveal axes 230 of the user's eyes intersect at that point. As can be seen in FIG. 2, the intersected C point on the electronic display element 210 indicates the gaze position. Note the as-drawn slight bend in the foveal axis 230 as it passes through the optics block 205 is due to the optics block 205 refracting the image light emitted from the electronic display element 210. A pupillary axis 235 is another axis of the eye 250 which is defined as the axis passing through the center of the pupil 260 which is perpendicular to the surface of the cornea 255. The pupillary axis does not, in general, directly align with the foveal axis 264. Both axes intersect at the center of the pupil 260, but the orientation of the foveal axis 264 is offset from the pupillary axis 266 by approximately −1 to 8° laterally and 4° vertically. The orientations of the pupillary and foveal axes 235, 230 changes as the eye 250 moves.

One or more eye tracking units can be used to track eye movement and/or position of the eye 250. For example, FIG. 2 illustrates the front rigid body 105 of the HMD as containing a first eye tracking unit corresponding to an OCT eye tracking unit 215 and a reference tracking unit corresponding to an eye tracking camera 220. The first eye tracking unit (e.g., OCT eye tracking unit 215) is configured to determine a position of the eye 250 at a first rate, by tracking movement of the eye 250, and the reference tracking unit (e.g., eye tracking camera 220) configured to determine the position of the eye 250 at a second rate that is slower than the first rate.

In some embodiments, the first eye tracking unit (e.g., OCT eye tracking unit 215) is configured to determine an eye position of the eye 250 by tracking movement of the eye 250. For example, the OCT eye tracking unit 215 determines a current position of the eye 250 based upon a previously determined position of the eye 250 and a determined offset between the previously determined position and the current position of the eye 250. The OCT eye tracking unit 215 emits a controlled numerical aperture light beam 225 with a controlled wavefront that illuminates a region of interest (ROI) of the eye 250. The ROI corresponds to a portion of the eye 250, which can change as the gaze direction moves, dependent upon how large the beam size ("eyebox") is for the OCT eye tracking unit 215. The ROI can be an area, a point, or a line, and may include various depth levels of the illuminated portion (e.g., surface of the eye and regions below the surface of the eye). The ROI may be located on, e.g., an edge of the sclera 275, surface of the cornea 255, a limbus (e.g., junction of the cornea 255 and sclera 275, a junction of the iris 270 and the sclera 275, a junction of the iris 270 and pupil 260, or any other suitable junction in the eye 250).

The OCT eye tracking unit 215 is set to a position for detecting light signals from a first illuminated portion of the eye at the ROI. As the eye moves, the ROI changes (i.e., illuminated portion of the eye changes), the OCT eye tracking unit 215 detects the backreflected light from the eye to determine an estimation of eye movement (in up to six (6) degrees-of-freedom, although at least two (2) would be required). This dataset may also be correlated into a baseline model to map the eye features and refine future estimates through repeated scans over the same region. Embodiments of OCT eye tracking units are further described in U.S. patent application Ser. No. 15/593,555, titled "Eye Tracking Using Optical Coherence Methods," which is hereby incorporated by reference in its entirety.

In some embodiments, the OCT eye tracking unit 215 is able to determine an absolute position of the eye based upon the detected backreflected light and the baseline model. However, doing so may require that the OCT eye tracking unit 215 capture the backreflected light at at least a certain resolution, potentially limiting a rate at which updated eye positions can be determined.

On the other hand, in order to improve the rate at which eye position can be determined, the OCT eye tracking unit 215 may, in some embodiments, be configured to capture the backreflected light at a lower resolution that is insufficient for absolute position determination, but is sufficient for relative motion tracking. For example, by analyzing datasets (e.g., 2D or 3D datasets) corresponding to backreflected light captured at different times, the OCT eye tracking unit 215 is able to observe shifts between the different datasets and determine relative motion of the eye, without requiring a sharper, higher resolution dataset needed to determine absolute position. Due to the lower resolution requirement for tracking relative motion of eye, the OCT eye tracking system 215 may be able to determine the position of the eye at a higher rate (e.g., 1 kHz or more) in comparison to determining the position of the eye using absolute positions. In addition, because the OCT eye tracking unit 215 generates datasets based upon backreflected light at one or more depths instead of surface reflected light, the OCT eye tracking unit 215 is less sensitive to specular reflections on the cornea surface or other optical phenomena that may make approximating linear motion more difficult. However, because each position determined using the OCT eye tracking unit 215 when tracking relative motion is determined based upon previously determined positions, it is possible for errors in the determination to accumulate, causing the determined positions to "drift" from the true position of the eye 250.

The reference tracking unit (e.g., eye tracking camera 220) is configured to capture images of the eye 250, whereupon a position of the eye 250 can be determined based upon the captured images. In some embodiments, a projector (not shown) or other type of light emitter may project a light pattern onto a portion of the eye 250, in order to produce glints on the eye 250 that can be detected in the captured images and used to determine the position of the eye 250. In other embodiments, shape recognition techniques may be used to identify and determine an orientation of the pupil 260 or the iris 270, from which the position of the eye 250 can be determined.

The eye tracking camera 220 is configured to determine an absolute position of the user's eye 250 using the captured one or more images of the eye 250 (e.g., by detecting one or more glints projected on the eye 250, determining a shape or position of the iris 270 or pupil 260 from the captured images, and/or the like). Because each position of the eye 250 determined using the eye tracking camera 220 is determined independently from previously determined positions, the amount of error may be minimized and is not carried over across multiple position determinations.

In some embodiments, because the OCT eye tracking unit 215 determines positions of the eye 250 over time at the first rate that is faster than the second rate at which the eye tracking camera 220 determines positions of the eye 250, the OCT eye tracking unit 215 is used to provide position information of the eye 250, while the positions determined using the eye tracking camera 250 are used to periodically correct for errors in the positions determined using the OCT eye tracking unit 215.

Estimation of Eye Movement

Figure 3:
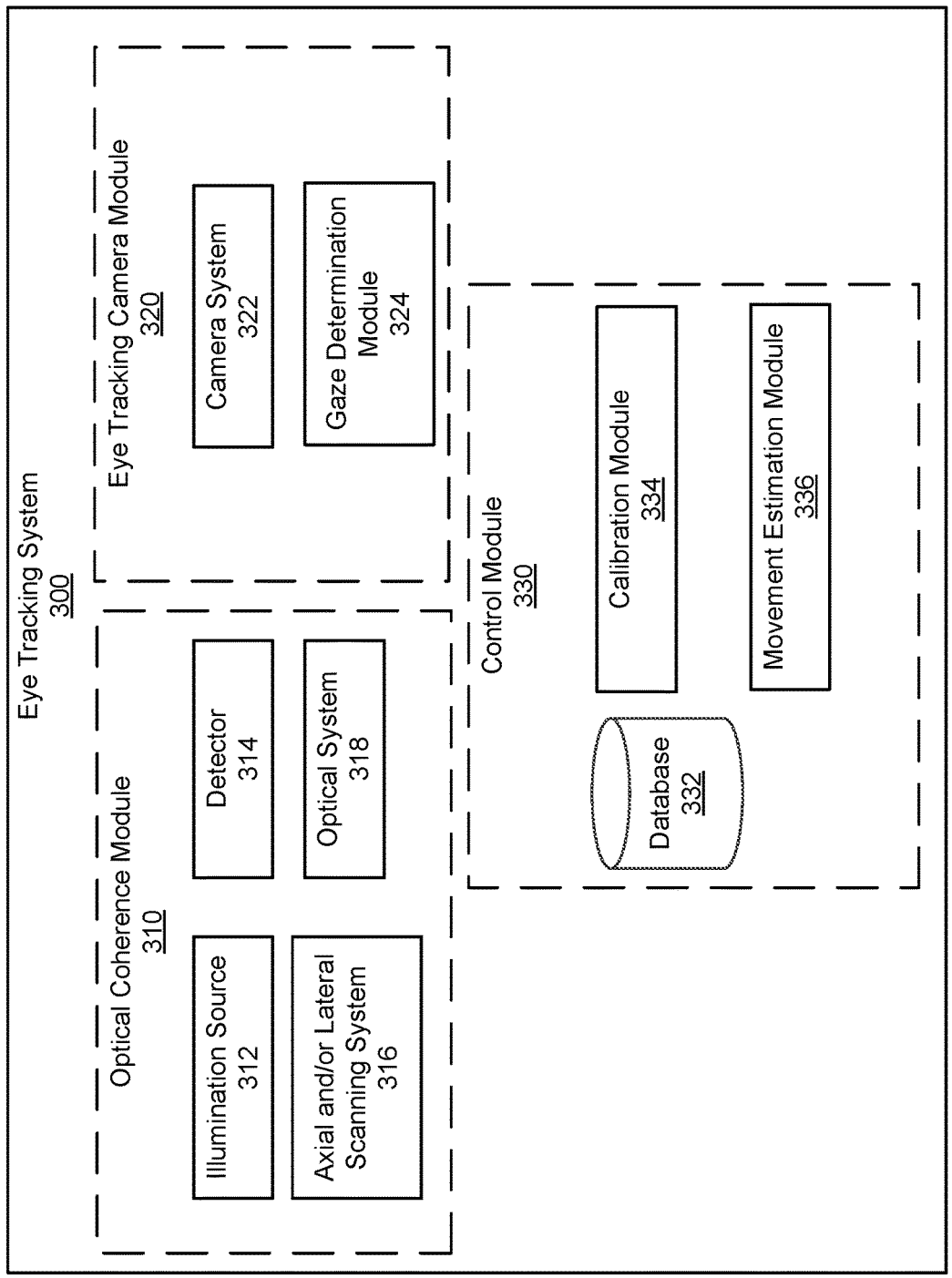
FIG. 3 is a block diagram of an eye tracking system, in accordance with an embodiment.

FIG. 3 is a block diagram of an eye tracking system 300, in accordance with an embodiment. The eye tracking system 300 implements a plurality of eye tracking units, and includes an OC module 310, an eye tracking camera module 320, and a control module 330. In some embodiments, the eye tracking system 300 is comprises the OCT eye tracking unit 215 and the eye tracking camera 220 illustrated in FIG. 2. For example, the OCT eye tracking unit 215 may be implemented as part of the OC module 310 and/or the control module 330. The eye tracking camera module 320 may comprise a camera system 322 corresponding to the eye tracking camera 220. Some embodiments of the eye tracking system 300 have different components than those described in conjunction with FIG. 3. Similarly, in embodiments, where the eye tracking system 300 is part of a HMD system (e.g., an MD system comprising the HMD 100 illustrated in FIG. 1), the functions described in conjunction with FIG. 3 may be distributed among other components in the HMD system in different manners in other embodiments. For example, some or all of the functionality provided by the control module 330 may be performed by an external console instead of the HMD.

The OC module 310 uses low coherent interfering wavefronts to isolate and measure desired backreflected or backscattered light from an illuminated portion of the eye at one or more axial (longitudinal) positions (e.g., depth). The low coherent interference is defined as independent optical signals that combine with the similar frequency and polarization states, but with different phase profiles which may either interfere constructively or destructively, allowing the system to isolate the signal of interest at a set depth boundary (defined in its axially dimension as up to the coherence length traditionally), and then if applicable, move the reference length (either through physical actuation, apparent reference arm path length, or source property changes) to measure characteristics at a different depth boundary. In one example, the low coherent interference occurs between a sample path capturing backreflected light from a depth that includes a portion of the eye and a reference path capturing light from a reference mirror.

In the example of FIG. 3, the OC module 310 estimates eye boundaries and features through overall differences in signal strength (contrast) that are measured over the ROI, including due to apparent index change of the user's eye by detecting the backreflected light signal from the illuminated portion of the eye. In one embodiment, the OC module 310 is set to a position for measuring an apparent contrast difference during eye movement. The initial set position corresponds to a ROI on the eye, and is seen to move across the eye boundary as the position of the eye (e.g., gaze direction) changes.

The OC module 310 includes an illumination source 312, a detector 314, a scanning system 316, and an optical system 318. Some embodiments of the OC module 310 have different components than those described in conjunction with FIG. 3. Similarly, the functions described in conjunction with FIG. 3 may be distributed among other components in the HMID system in different manners in other embodiments. For example, some or all of the functionality provided by the OC module 310 may be performed by the control module 330.

The illumination source 312 illuminates a portion of the user's eye (e.g., the ROI) that affects apparent index change with a predetermined illumination power. The predetermined illumination power is less than a threshold that causes injury to the eye. The illumination source 312 may provide point, line, or small area illumination depending on the type of illumination source 312, detector 314, and optical system 318. In some embodiments, the illumination source 312 is selected depending on, e.g., spectral width that defines the depth resolution and spectrometric resolution, numerical aperture (NA) that defines the lateral resolution, other factor that affects depth penetration or eye absorption and scattering, form factor, or some combination thereof. In some embodiments, the OC module 310 may include multiple illumination sources for illuminating one or more illuminated portions of the eye.

The scanning system 316 scans the illuminated portion of the eye at various axial positions (e.g., depth). In some embodiments, the scanning system 316 may include a reference system (e.g., reference mirror). By varying a position of the reference system, the scanning system 316 is able to scan illuminated portion of the eye at various depths. The scanning system 316 is not limited to use of a reference system, it can also use other configurations for obtaining signals at various axial positions. For example, the scanning system 316 may include a spectrometer for measurement or a wavelength tunable light source.

In some embodiments, the scanning system 316 may scan a surface of a portion of the eye for obtaining two-dimensional datasets. In order to track the eye position, at least a 2D (lateral, horizontal and vertical for instance) data set is required to fully bound the rotation/translation vectors. In some embodiments, the scanning system 316 captures a 2D dataset in a "snapshot." In other embodiments, the scanning system 316 comprises a lateral scanning system for capturing the 2D dataset.

The optical system 318 uses optical elements for light propagation among the illumination source 312, the detector 314, the scanning system 316, and the eye 250. Example optical elements include: an aperture, a grating, a lens, a mirror, a fiber, a fiber bundle or array, a filter, a prism, a polarizer, or another suitable optical element affecting illumination and light collection, or some combination thereof. The optical system 318 may include combinations of different optical elements. For example, the optical system 318 may include a beam splitter splitting a light beam into two. The beam splitter is configured to divide the light projected from the illumination source 312 into a first portion projected towards a reference mirror, and a second portion that illuminates the portion of the user's eye, wherein the position of the reference mirror is selected based upon a desired axial position. The detector 314 captures the first portion of the projected coherent light reflected by the reference mirror and the second portion of light reflected from the illuminated portion of the user's eye. As another example, the optical system 318 includes a collimator comprising mirrors or lenses for aligning light from the illumination source in a specific direction. The optical system 318 may also include a beam expander comprising prisms or lenses for expanding a light beam (e.g., emitted by the illumination source 312) to illuminate a ROI. Additionally, the optical system 318 may include imaging lenses for collecting and mapping reflected lights from the ROI to the detector 314.

The detector 314 detects backreflected light from the illuminated portion of the eye. The detector 314 outputs a detection signal proportional to the detected light, which may comprise a combination of light reflected portion of the user's eye and light reflected from a reference mirror. The detector 314 is a device that converts light into electronic signals (e.g., photodetector). The detector 314 is capable of measuring changes in light, such as changes related to optical properties of the light (e.g., intensity, phase, polarization, wavelength and spectral distribution). In some embodiments, the detector 314 may be based on single-point detection (e.g., photodiode, balanced/matched photodiodes, or avalanche photodiode), or based on one or two-dimensional detector arrays (e.g., linear photodiode array, CCD array, or CMOS array). In some embodiments, the OC module 310 may include multiple detectors 314 to capture light reflected from one or more illuminated portions of the eye.

The eye tracking camera module 320 captures images of the user's eye, which can be used to determine a position of the eye, and comprises a camera system 322 and a gaze determination module 324. Some embodiments of the eye tracking camera module 320 have different components than those described in conjunction with FIG. 3. Similarly, functions of the components described in conjunction with the eye tracking camera module 320 may be distributed among other components in the eye tracking system 300 in a different manner than described in conjunction with FIG. 3. For example, some or all of the functionality described as performed by the eye tracking camera module 320 may be performed by the control module 330.

The camera system 322 is configured to capture one or more images of the user's eye. In some embodiments, the camera system 322 is configured to capture image data in a visible spectrum, an IR spectrum, and/or the like. In some embodiments, the eye tracking camera module 320 further comprises a projector system (not shown) configured to project a light pattern or pattern of glints over the user's eye that can be detected in the images captured by the camera system 322.

The gaze determination module 324 receives the image data captured by the camera system 322 and determines a position (e.g., a gaze direction) of the user's eye. In some embodiments, the gaze determination module 324 analyzes the received images to determine locations of one or more glints projected on the user's eye, and determines the position of the user's eye based upon the identified glint locations. In other embodiments, the gaze determination module 324 analyzes the received images to determine a size or shape of the iris or pupil of the user's eye, from which the position of the user's eye can be determined.

The control module 330 determines eye movement using OC data obtained from the OC module 310. The OC data is information that can be used to track eye movement. The OC data may include, e.g., illumination positions on the eye, detected information of the eye (e.g., apparent contrast change), axial positions (e.g., depth), temporal information, detected signals from the detector 314, any other suitable factor affecting eye movement, or some combination thereof. In the example shown by FIG. 3, the control module 330 includes a database 332, a calibration module 334, and a movement estimation module 336. These modules are software modules implemented on one or more processors, dedicated hardware units, or some combination thereof. Some embodiments of the control module 330 have different components than those described in conjunction with FIG. 3. Similarly, functions of the components described in conjunction with the control module 330 may be distributed among other components in the eye tracking system 300 in a different manner than described in conjunction with FIG. 3. For example, some or all of the functionality described as performed by the control module 330 may be performed by eye tracking camera module 320 and/or the OC module 310.

The database 332 stores OC data from the OC module 310, calibration and baseline data from the calibration module 334 describing trained or established baseline prior to eye tracking, and analysis data from movement estimation module 336 describing characterization parameters.

The calibration module 334 generates or trains baseline data prior to eye tracking. In one embodiment, the user is instructed to look at one or more virtual objects or visual indicators that are displayed at several baseline locations (e.g., corners, centers, other suitable locations affecting estimation of eye's positions, or some combination thereof) on the display screen (e.g., electronic display 210). As the user gazes at each baseline location, the user's eye is positioned in a corresponding eye position, the calibration module 334 retrieves corresponding OC data collected by the OC module 310. The calibration module 334 generates calibration data by mapping the OC data for each baseline position to its corresponding eye positions. The calibration module 334 then interpolates the calibration data into a trained baseline model (e.g., a lookup table), which is stored in the database 332. Once the calibration module 334 has produced the trained baseline model, eye tracking may begin. In some embodiments, the calibration module 334 continues to update the trained baseline model during subsequent eye tracking operations.

In some embodiments, the trained baseline model may be a lookup table describing the relation between OC data and eye position parameters (e.g., vergence angle, etc.). The trained baseline model may be a two-dimensional (2D) or 3D model describing the structural information and movement of the eye. The 2D model may give an image along one direction of the surface and along an axial direction (e.g., a y-z image, or an x-z image in x-y-z coordinate system).

The movement estimation module 380 estimates eye position and/or movement parameters using OC data from the OC module 310 and/or the trained baseline model from the calibration module 334. The OC data may comprise one or more detection signals, illumination positions associated with eye movement, and temporal information associated with eye movement. Using the OC data the movement estimation module 380 retrieves a corresponding eye position from the trained baseline model.

The trained baseline model indicates the relationship between the area profile at each illumination position and eye position. Accordingly, given OC data including indicating the area profile of an illuminated ROI, the movement estimation module 336 is able to retrieve a corresponding eye position. In this manner, the provided OC data allows the system to act as a fast coordinate transformation and global position. In some embodiments, OC data captured at different times can be correlated, the correlation indicating an offset traversed by the eye during a time interval. Over time as the database 332 is populated, the OC dataset can act as a "fingerprint" to identify where the eye is currently pointing based upon its unique features captured, stored from the training and/or previous usage.

As discussed above, the OC module 310 may be able to determine an absolute position of the user's eye, or relative motion of the user's eye, based upon a resolution the captured OC dataset. For example, the OC module 310 may be able to determine an absolute position of the eye by comparing the captured OC dataset with the trained baseline. However, doing so would the captured OC dataset to be of at least a certain resolution and to cover at least a certain area of the eye. On the other hand, to determine relative motion of the eye, the OC dataset captured by the OC module 310 may be of lower resolution and may correspond to a smaller area of the eye, allowing for relative eye positions to be calculated at a faster rate.

As such, the OC module 310 can be used to determine relative motion of the user's eye, while the eye tracking camera module 320 periodically determines an absolute position of the user's eye used to correct the relative positions determined by the OC module 310. This allows for the position of the user's eye to be determined at a fast rate, while preventing accumulated error resulting from the relative position determinations from growing too large.

Figure 4:
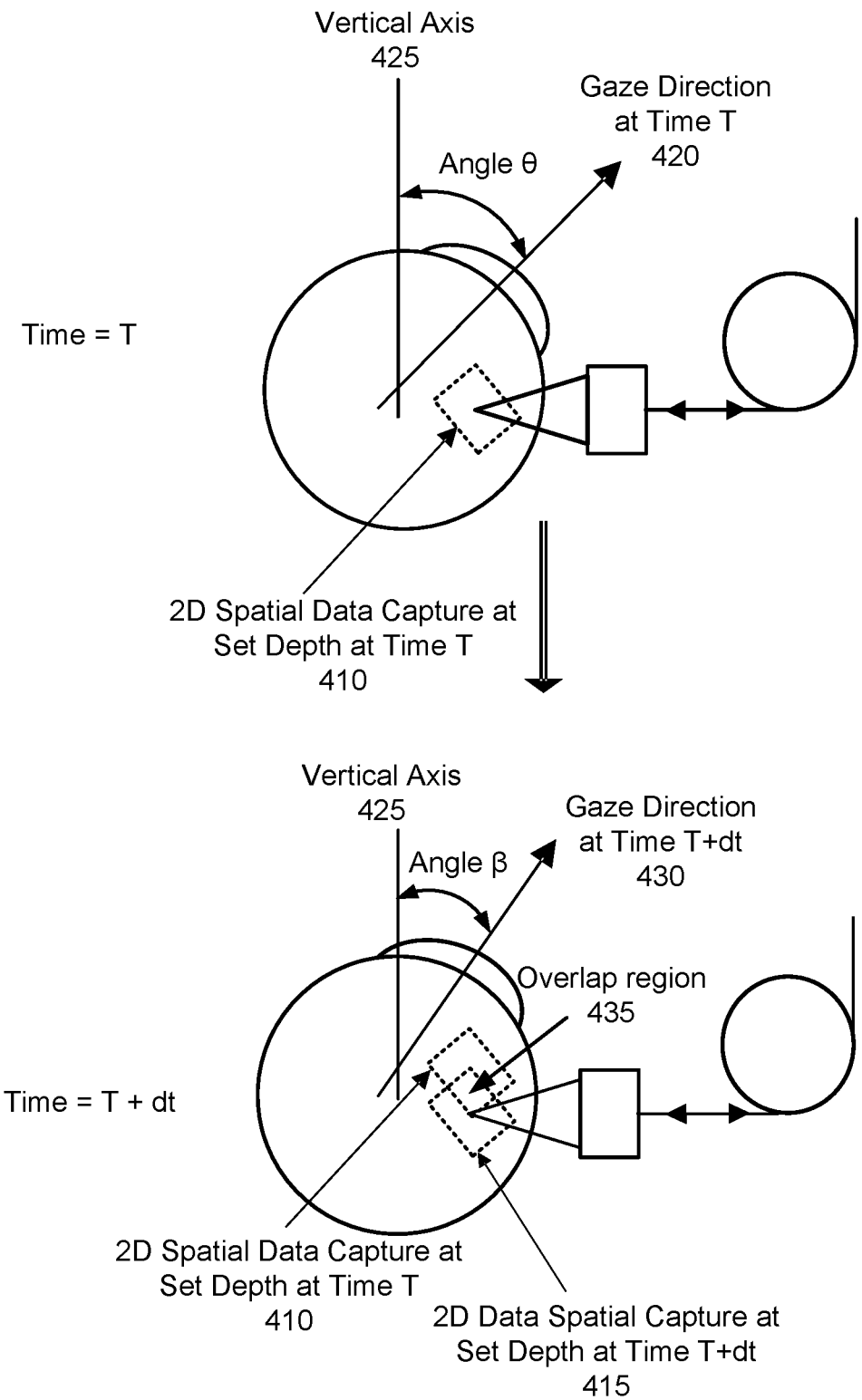
FIG. 4 depicts two data captures of a single eye that may be performed by an OCT eye tracking unit for tracking eye movement, in accordance with an embodiment.

FIG. 4 depicts two data captures of a single eye that may be performed by an OCT eye tracking unit for tracking eye movement, in accordance with an embodiment. The OCT eye tracking unit may correspond to the OCT eye tracking unit 215 illustrated in FIG. 2.

Movement of the user's eye can be determined via correlation mapping from one dataset measured at a first time to a subsequent dataset measured at a second time. Over a given time interval dt, 2D spatial data capture at a set depth at a time T 410 is obtained, and then at a subsequent later time T+dt, another 2D spatial data capture at the set depth at time T+dt 415 is obtained. The 2D dataset 410 corresponds to the eye position defined by the angle θ between a vertical axis 425 and the gaze direction 420 at time T. The 2D dataset 415 corresponds to the eye position defined by the angle β between the vertical axis 425 and the gaze direction 430 at time T+dt. Due to the eye movement from the angle θ to the angle β, there is an offset (or a displacement) between the 2D datasets 410 and 415. The two datasets 410 and 415 overlap by overlap region 435. Based on the differences between the overlap region 435 in each dataset, the offset between the two datasets, which corresponds to the eye movement position from the angle θ to the angle β in the time interval dt, is determined. The offset is able to provide an acceptable value corresponding to the eye position moved between the identified time interval. As such the OCT eye tracking unit is able to determine a position of the eye at a current time (e.g., time T+dt) based upon a position of the eye at a previous time (e.g., time T). In addition, the determined position may be used to update the baseline model (e.g., mapping the 2D dataset 415 to the determined eye position).

Drift Error Correction

Figure 5A:
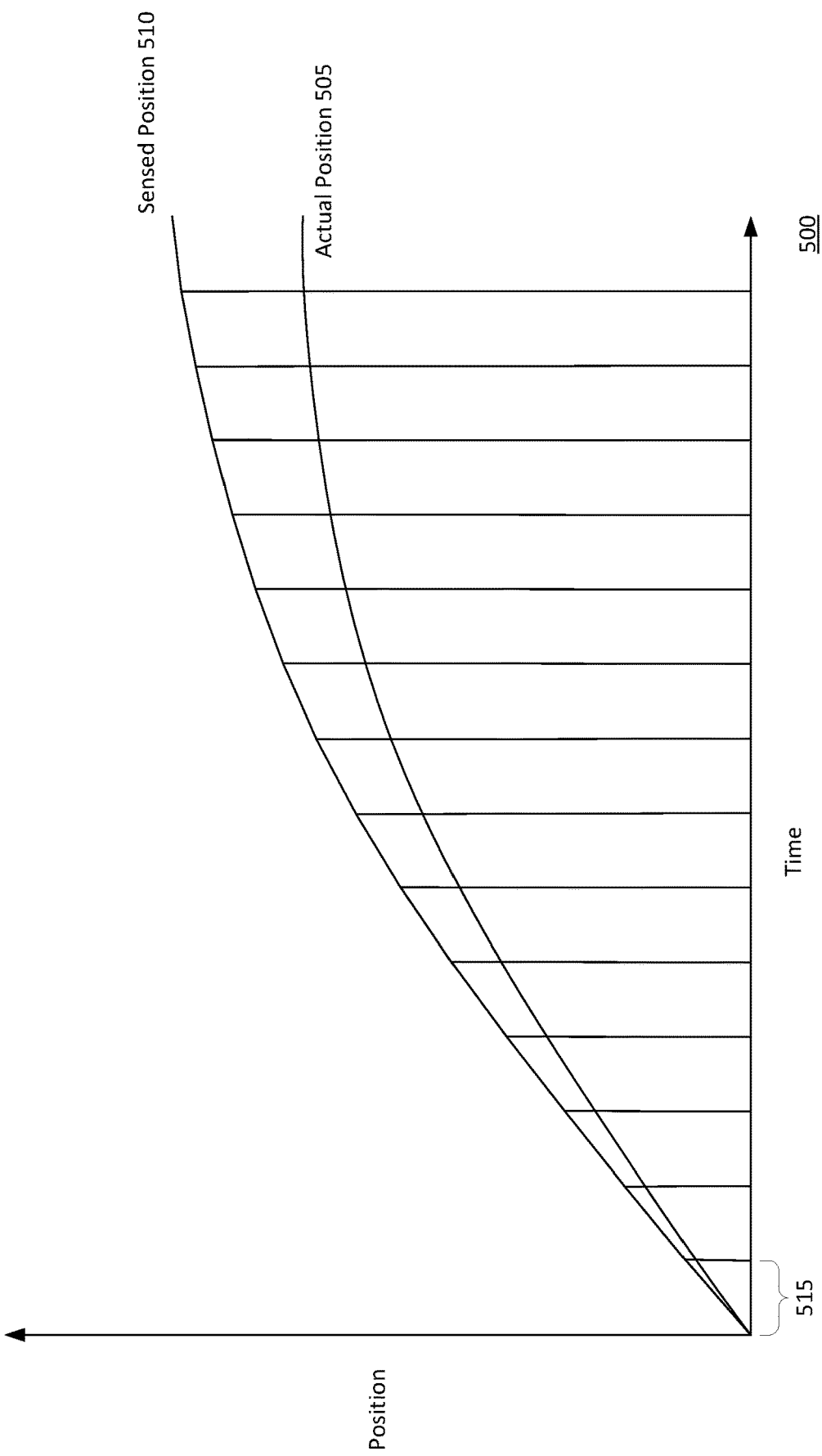
FIG. 5A depicts a graph illustrating errors that may accumulate over time when using OCT eye tracking to determine eye position, in accordance with some embodiments.

FIG. 5A depicts a graph illustrating errors that may accumulate over time when using OCT eye tracking to determine eye position, in accordance with some embodiments. The graph 500 comprises an x-axis corresponding to time, and a y-axis corresponding to position. The position indicated on the y-axis of the graph 500 may correspond to a position or angle of the eye relative to a particular axis, or may correspond to an aggregation of one or more position parameters of the eye (e.g., spatial position of the eye, orientation of the eye, aggregate movement of the eye, etc.).

The graph 500 illustrates a first plot 505 corresponding to the actual position of the user's eye over time, and a second plot 510 corresponding to a position of the user's eye determined by an OCT eye tracking unit (e.g., the OCT eye tracking unit 215 illustrated in FIG. 2). The OCT eye tracking unit is configured to determine the position of the user's eye periodically. For example, FIG. 5 illustrates the OCT eye tracking unit determining an eye position over each time period 515.

By tracking movement of the user's eye, the OCT eye tracking unit determines a current position of the user's eye based upon a previously determined position of the user's eye and a determined displacement or offset between the previous position and the current position. As such, any errors in the previously determined position are passed on to the determined current position. Over many time periods 515, the position of the eye as determined using the OCT eye tracking unit may "drift" away from the true position of the user's eye, as the amount of error increases with each subsequent determination.

Figure 5B:
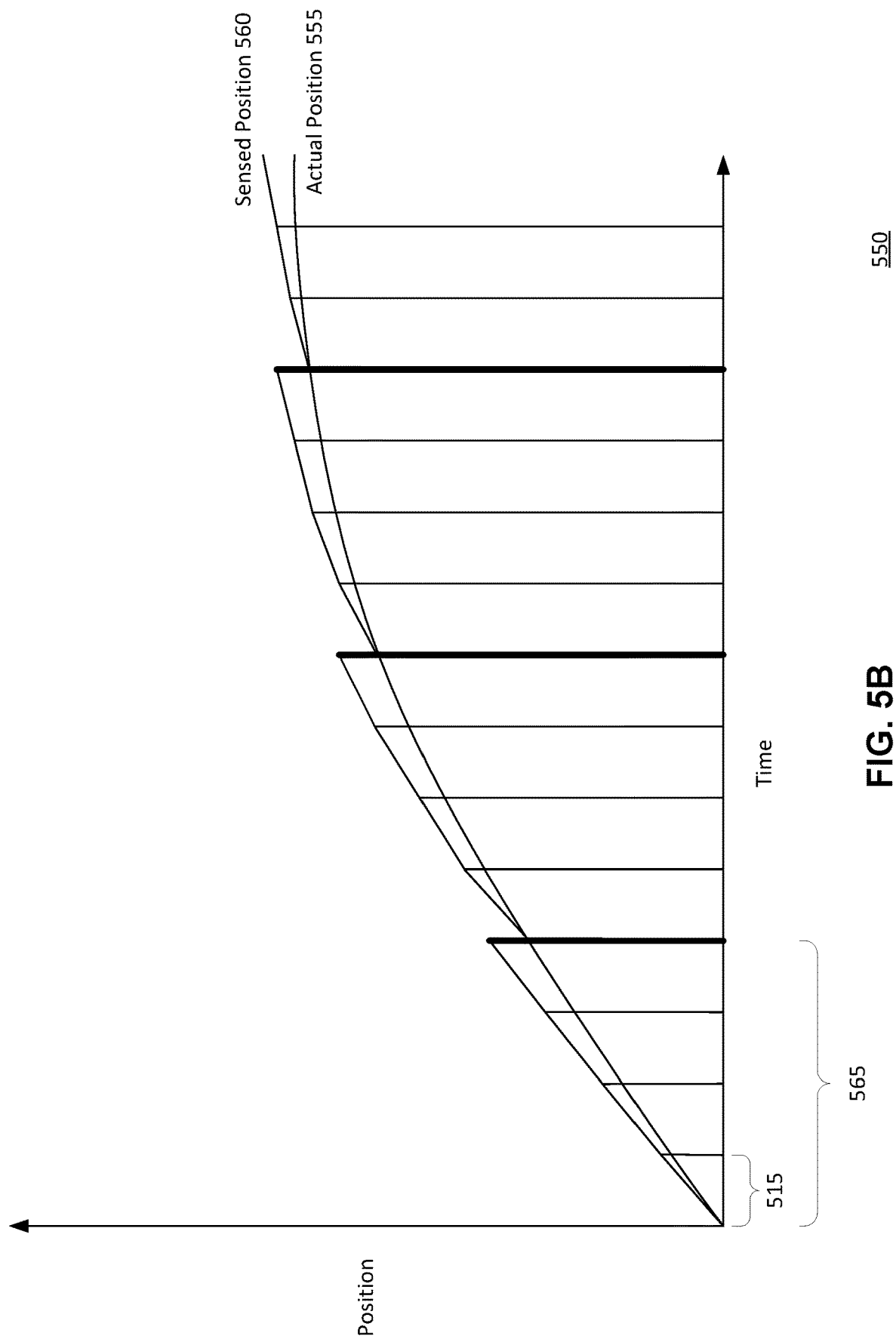
FIG. 5B depicts a graph illustrating eye position determinations of an eye tracking system that implements correction of drift error, in accordance with some embodiments.

FIG. 5B depicts a graph illustrating eye position determinations of an eye tracking system that implements correction of drift error, in accordance with some embodiments. Similar to the graph 500 illustrated in FIG. 5A, the graph 550 comprises an x-axis corresponding to time, and a y-axis corresponding to position, which may correspond to a position or angle of the eye relative to a particular axis, or may correspond to an aggregation of one or more position attributes of the eye (e.g., spatial position of the eye, orientation of the eye, aggregate movement of the eye, etc.). The graph 550 contains a first plot 555 corresponding to the actual position of the user's eye over time, and a second plot 560 corresponding to the drift corrected position of the user's eye, as determined by an OCT eye tracking unit in conjunction with an eye tracking camera system (e.g., the eye tracking camera 220 as illustrated in FIG. 2). In some embodiments, the eye tracking camera system may correspond to any eye tracking system able to independently determine positions of the user's eye.

As in FIG. 5A, the OCT eye tracking unit determines a first position of the user's eye over each time period 515. In addition, the eye tracking camera system determines a second position of the user's eye at a rate that is slower than that of the OCT eye tracking unit (e.g., every time period 565). In some embodiments, the rate at which the OCT eye tracking unit determines the first position of the user's eye may be a multiple of the rate at which the eye tracking camera system is able to determine second positions of the user's eye. In some embodiments, the time period 565 is configured to correspond to a time period over which an amount of error between the sensed position 560 and the actual position 555 is expected to not exceed a threshold value.

The eye tracking system (e.g., eye tracking system 300) receives the first positions determined by the OCT eye tracking unit. In addition, when second positions of the user's eye as determined using the eye tracking camera are available (e.g., every time period 565), the eye tracking system performs drift correction by updating the first positions based upon the determined second positions. In some embodiments, the eye tracking system further updates a baseline model utilized by the OCT eye tracking unit based upon the determined second position (e.g., by mapping the updated first position to the OC data received from the OCT eye tracking unit).

In some embodiments, performing drift correction may comprise replacing the determined first position with the determined second position. In other embodiments, the eye tracking system updates the first position determined by the OCT eye tracking unit based upon the second position determined using the eye tracking camera system, or based upon a difference between the first and second positions. For example, the eye tracking system may update the first position using a percentage of the difference between the first and second positions. In some embodiments, each of the first and second positions are associated with a level of uncertainty. As such, the first position may be updated based upon the second position, as well as the respective uncertainty levels associated with the first and second positions (e.g., using a Kalman filter). In some embodiments, the first position is further updated based upon one or more previously determined first positions (e.g., the current uncertainty level of the first position may be based upon one or more previous first position determinations).

In some embodiments, the eye tracking system may further update the baseline model used for OCT eye tracking based upon the second position or the difference between the first and second positions. For example, the eye tracking system may update the baseline model to correlate the OC data obtained from the OCT eye tracking unit with the second position instead of the first position, or with the updated first position.

While FIG. 5B illustrates updating the first positions determined by the OCT eye tracking unit at periodic intervals (e.g., once per time period 565), it is understood that in other embodiments, drift correction may not occur periodically. For example, in some embodiments, the eye tracking unit may only perform drift correction when a difference between the first position determined at a given time and the second position determined at the same time exceeds a threshold value.

Process Flow

Figure 6:
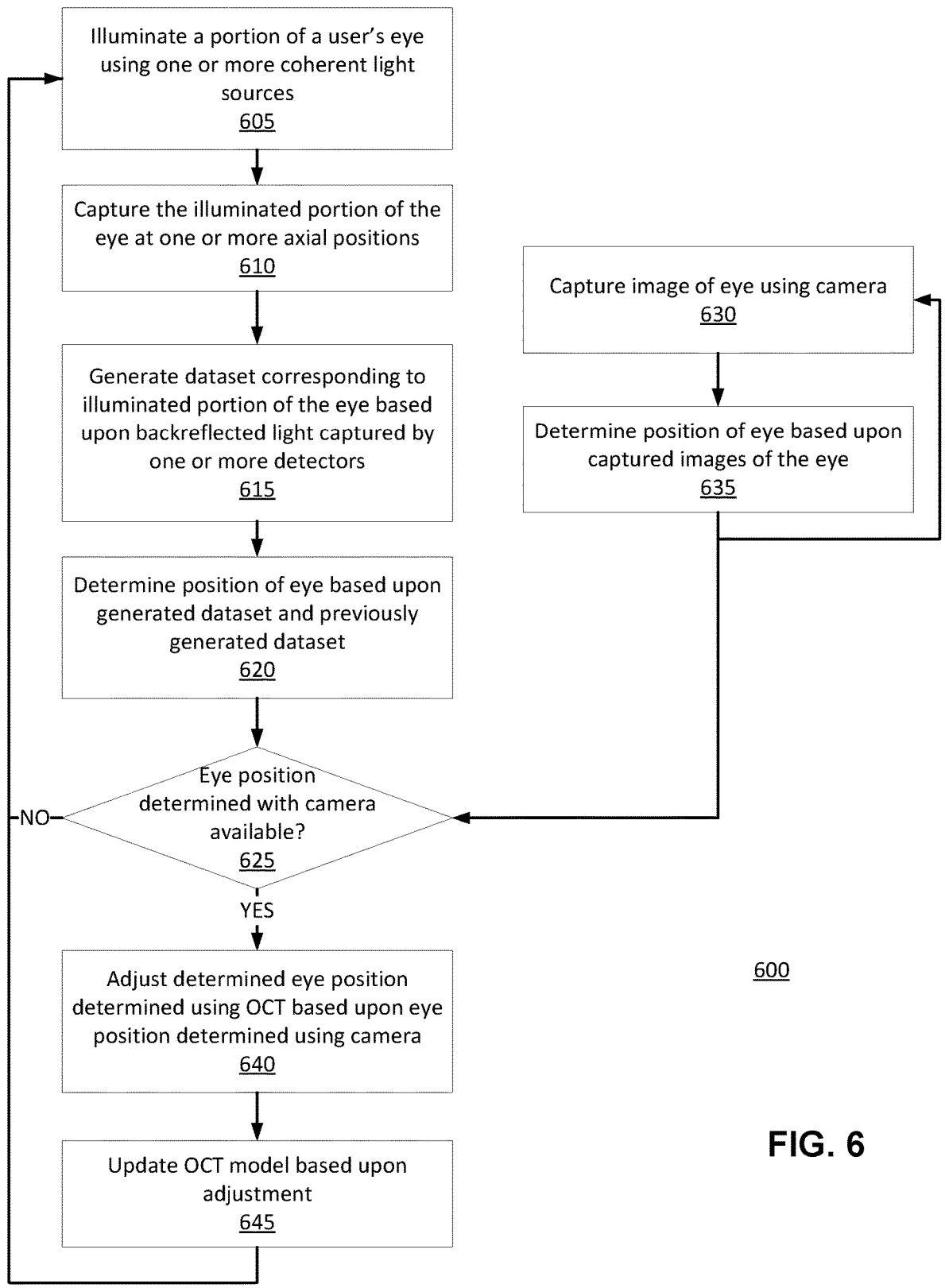
FIG. 6 is a flowchart of a process for tracking eye movement, in accordance with an embodiment.

FIG. 6 is a flowchart of one embodiment of a process 600 for tracking eye movement, in accordance with an embodiment. The process 600 may be performed by an eye tracking system, such as the eye tracking system 300 illustrated in FIG. 3. Alternatively, other components may perform some or all of the steps of the process 600. Additionally, the process 600 may include different or additional steps than those described in conjunction with FIG. 6 in some embodiments or perform steps in different orders than the order described in conjunction with FIG. 6.

The eye tracking system illuminates 605 a portion of a user's eye using one or more coherent light sources (which may correspond to the illumination source 312). For example, a low coherence light source of the eye tracking system illuminates a point, or a line, or a cross, or a small area of a user's cornea surface corresponding to a region of interest (ROI).

The eye tracking system captures 610 the illuminated portion of the eye at one or more axial positions (depths) (e.g., via the detector 314). The axial position is determined by a position of a reference mirror or the source characteristics (such as spectrum). For example, in static mode, the eye tracking system collects data from the illuminated portion of the eye at a specific axial position by fixing the position of a reference mirror (e.g., associated with the scanning system 316). In a particular example, the specific axial position is on the surface of the illuminated portion of the eye. In dynamic mode, the eye tracking system 300 collects data from the illuminated portion of the eye at various axial positions by varying positions of the reference mirror.

The eye tracking system generates 615 a dataset corresponding to the illuminated portion of the eye based upon backreflected light from the illuminated portion of the eye captured by one or more detectors. In some embodiments, the generated dataset corresponds to a 2D region of the eye corresponding to the ROI illuminated by the coherent light sources.

The eye tracking systems determines 620 a first position of the user's eye based upon the generated dataset and a previously generated dataset. The previously generated dataset may correspond to a dataset generated by the eye tracking unit during the previous time period. In some embodiments, the eye tracking system determines the first position based upon an offset between the generated dataset and the previously generated dataset. In some embodiments, the eye tracking system compares the generated dataset with a trained baseline model to extract an estimate of an eye position. For example, the eye tracking system is able to extract the estimate of the eye positions by mapping the dataset to the trained baseline. In some embodiments, the eye tracking system updates the trained baseline model based on the estimate of the eye position, allowing the system to refine the trained baseline model based upon eye movement magnitude and direction by taking into account previous knowledge of the eye and measurement features.

The eye tracking system may in parallel determine second positions of the user's eye using a reference tracking system. For example, the eye tracking system may, using the reference tracking system, capture 630 images of the eye using an eye tracking camera (e.g., the camera system 322 illustrated in FIG. 3). The eye tracking system further, using the reference tracking system, determines 635 a position of the eye based upon the images of the eye captured using the eye tracking camera. For example, the eye tracking system may identify one or more glints in a captured image, or determine a size or shape of the user's iris or pupil is captured in the one or more images, in order to determine a second position of the user's eye. In some embodiments, the eye tracking system 300 determines second positions of the user's eye using the eye tracking camera at a rate slower than the rate at which the eye tracking system 300 determines first positions of the user's eye.

The eye tracking system, upon determining each first position of the user's eye, determines 625 if a second position of the user's eye is available. A second position of the user's eye may be considered to be available if a second position is determined within a threshold time as the determination of the first position. If not, the eye tracking system may continue to determine first positions of the user's eye over subsequent time periods until a second position is available. In some embodiments, the eye tracking system may further determine if the difference between a determined first position and a corresponding second positions exceeds a threshold value.

On the other hand, if a second position is available, the eye tracking system adjusts 640 the determined first eye position based upon the determined second eye position. In some embodiments, the eye tracking system replaces the first determined position with the second determined position. In other embodiments, the eye tracking system updates the first position based upon a difference between the first and second positions. By updating the determined first position based upon the second position, an amount of error due to drift over multiple position determinations may be reduced.

The eye tracking system may further update 645 the baseline model used to determine the first positions based upon the adjustment. For example, in some embodiments, the eye tracking system may update the model to correlate the determined dataset with the adjusted first position, improving the accuracy of the baseline model.

System Overview

Figure 7:
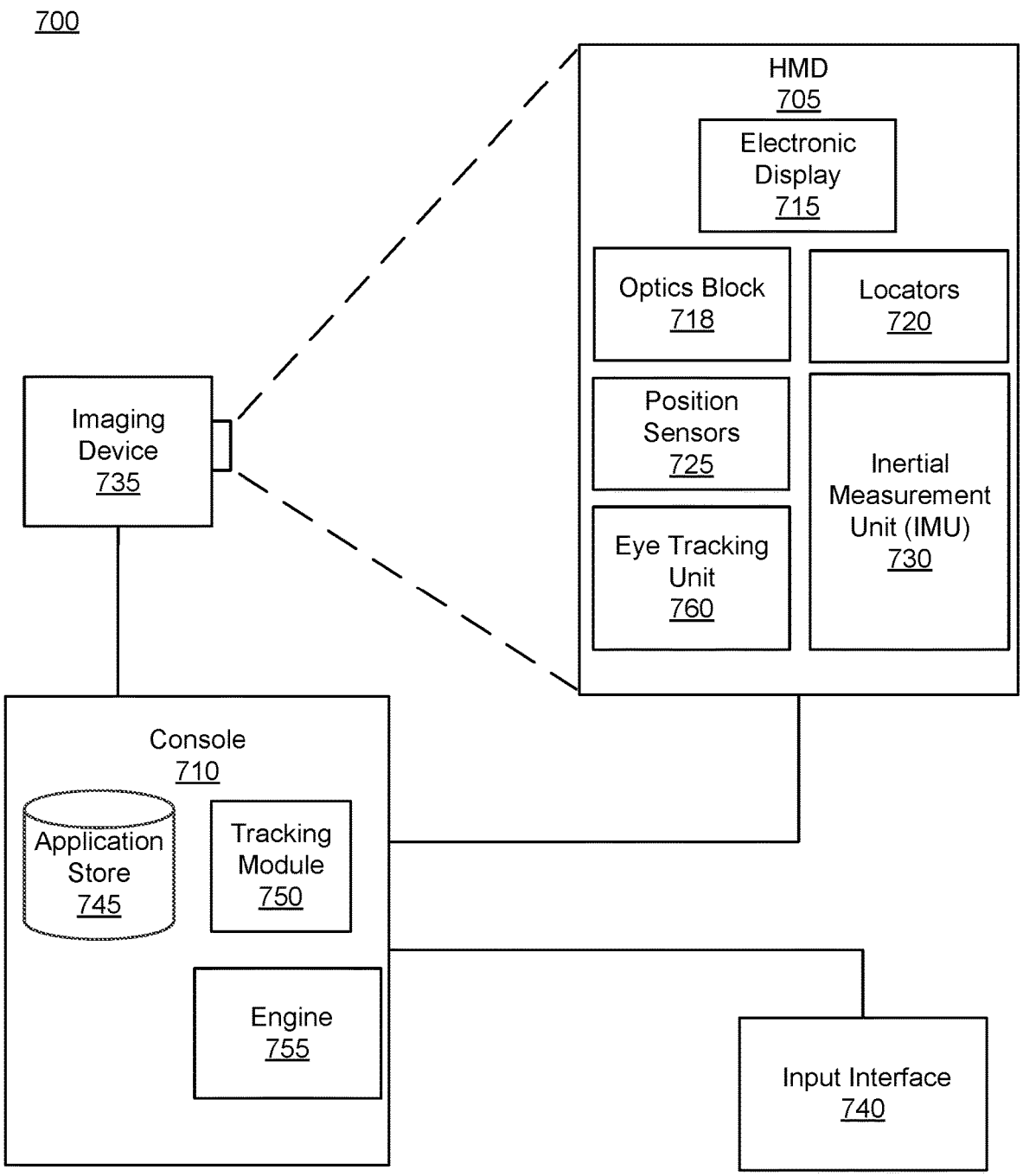
FIG. 7 is a block diagram of a virtual reality system environment, in accordance with an embodiment.

FIG. 7 is a block diagram of an HMD system 700. The HMD system 700 shown by FIG. 7 comprises an HMD 705 (which may correspond to the HMD 100 illustrated in FIG. 1), an imaging device 735, and an input interface 740 that are each coupled to the console 710. The HMD system 700 may be used to generate an artificial reality that is presented to a user of the HMD 705. While FIG. 7 shows an example HMD system 700 including one HMD 705, one imaging device 735, and one input interface 740, in other embodiments any number of these components may be included in the HMD system 700. For example, there may be multiple HMDs 705 each having an associated input interface 740 and being monitored by one or more imaging devices 735, with each HMD 705, input interface 740, and imaging devices 735 communicating with the console 710. In alternative configurations, different and/or additional components may be included in the HMD system 700. Similarly, functionality of one or more of the components can be distributed among the components in a different manner than is described here. For example, some or all of the functionality of the console 110 may be contained within the HMD 705.

The HMD 705 is a head-mounted display that presents content to a user, and may correspond to the HMD 100 illustrated in FIG. 1. Examples of content presented by the HMD 705 include one or more images, video, audio, or some combination thereof. In some embodiments, audio is presented via an external device (e.g., speakers and/or headphones) that receives audio information from the HMD 705, the console 710, or both, and presents audio data based on the audio information. The HMD 705 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 705 may also act as an augmented reality (AR) headset. In these embodiments, the HMD 705 augments views of a physical, real-world environment with computer-generated elements (e.g., images, video, sound, etc.).

The HMD 705 includes an electronic display 715, an optics block 718, one or more locators 720, one or more position sensors 725, an inertial measurement unit (IMU) 730, and an eye tracking unit 760. The electronic display 715, optics block 718, locators 720, position sensors 725, and IMU 730 may correspond respectively to the electronic display element 210, optics block 205, locators 135, position sensors 125, and IMU 120 illustrated in FIGS. 1 and 2. The eye tracking unit 760 may correspond to the eye tracking system 300 of FIG. 3, or one or both of the OCT eye tracking unit 215 and eye tracking camera 220 illustrated in FIG. 2. Some embodiments of the MD 705 have different components than those described here. Similarly, the functions can be distributed among other components in the HMD system 700 in a different manner than is described here. For example, some of the functions of the eye tracking unit 760 may be performed by the console 710. The electronic display 715 displays images to the user in accordance with data received from the console 710.

The optics block 718 magnifies received light from the electronic display 715, corrects optical errors associated with the image light, and the corrected image light is presented to a user of the MD 705. The optics block 718 may comprise an optical element, such as an aperture, a Fresnel lens, a convex lens, a concave lens, a filter, or any other suitable optical element that affects the image light emitted from the electronic display 715. Moreover, the optics block 718 may include combinations of different optical elements. In some embodiments, one or more of the optical elements in the optics block 718 may have one or more coatings, such as partial reflectors or anti-reflective coatings.

Magnification of the image light by the optics block 718 allows the electronic display 715 to be physically smaller, weigh less, and consume less power than larger displays. Additionally, magnification may increase a field of view of the displayed content. For example, the field of view of the displayed content is such that the displayed content is presented using almost all (e.g., 1100 diagonal), and in some cases all, of the user's instantaneous field of view. In some embodiments, the optics block 718 is designed so its effective focal length is larger than the spacing to the electronic display 715, which magnifies the image light projected by the electronic display 715. Additionally, in some embodiments, the amount of magnification may be adjusted by adding or removing optical elements.

The optics block 718 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal comatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 715 for display is pre-distorted, and the optics block 718 corrects the distortion when it receives image light from the electronic display 715 generated based on the content.

The locators 720 are objects located in specific positions on the HMD 705 relative to one another and relative to a specific reference point on the MD 705. A locator 720 may be a light emitting diode (LED), a corner cube reflector, a reflective marker, a type of light source that contrasts with an environment in which the MD 705 operates, or some combination thereof. In embodiments where the locators 720 are active (i.e., an LED or other type of light emitting device), the locators 720 may emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof.

In some embodiments, the locators 720 are located beneath an outer surface of the HMD 705, which is transparent to the wavelengths of light emitted or reflected by the locators 720 or is thin enough not to substantially attenuate the wavelengths of light emitted or reflected by the locators 720. Additionally, in some embodiments, the outer surface or other portions of the MD 705 are opaque in the visible band of wavelengths of light. Thus, the locators 720 may emit light in the IR band under an outer surface that is transparent in the IR band but opaque in the visible band.

The IMU 730 is an electronic device that generates IMU data based on measurement signals received from one or more of the position sensors 725. A position sensor 725 generates one or more measurement signals in response to motion of the HMD 705. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals from one or more position sensors 725, the IMU 730 generates IMU data indicating an estimated position of the HMD 705 relative to an initial position of the HMD 705. For example, the position sensors 725 include multiple accelerometers to measure translational motion (forward/back, up/down, left/right) and multiple gyroscopes to measure rotational motion (e.g., pitch, yaw, and roll). In some embodiments, the IMU 730 rapidly samples the measurement signals and calculates the estimated position of the HMD 705 from the sampled data. For example, the IMU 730 integrates the measurement signals received from the accelerometers over time to estimate a velocity vector and integrates the velocity vector over time to determine an estimated position of a reference point on the HMD 705. Alternatively, the IMU 730 provides the sampled measurement signals to the console 710, which determines the IMU data. The reference point is a point that may be used to describe the position of the HMD 705. While the reference point may generally be defined as a point in space; however, in practice the reference point is defined as a point within the HMD 705 (e.g., a center of the IMU 730).

The IMU 730 receives one or more calibration parameters from the console 710. As further discussed below, the one or more calibration parameters are used to maintain tracking of the HMD 705. Based on a received calibration parameter, the IMU 730 may adjust one or more IMU parameters (e.g., sample rate). In some embodiments, certain calibration parameters cause the IMU 730 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking unit 760 tracks a user's eye movement using an optical coherence (OC) module (e.g., the OC module 310 illustrated in FIG. 3). The OC module includes a comparably low coherence (e.g., less than 50 millimeters) light source to project light onto a portion of the user's eye, a detector to collect backreflected light from the illuminated portion of the eye at one or more axial (longitudinal) positions, and optionally if employing less than a 2-dimensional detector array, a scanning system to scan the illuminated portion of the eye at various lateral (horizontal and/or vertical at a given depth of the eye) positions. An axial position is a position along a longitudinal axis that intersects the illuminated portion of the eye. An axial position is generally located at a depth value that may range from a surface of the illuminated portion of the eye to some depth value below the surface of the illuminated portion of the eye. Different axial positions correspond to different depths from the surface of the illuminated portion. A lateral position is a position along a direction that is orthogonal to the longitudinal axis. For example, at a given axial position, a lateral position is orthogonal to the given axial position. Various lateral positions may correspond to the given axial positions. The collected light corresponds to a reflectance (and scatter) magnitude of the illuminated portion of the eye. The reflectance correlates with an apparent index change at a given depth plane location of a user's eye (e.g., a point, a line or a small area of sclera, cornea). This information is built into a 2D data set at each (if more than one) depth plane captured, where the resulting "image" is a digital representation of the coherent signal magnitude received. This in turn forms the basis for a temporal correlation algorithm (similar to optical flow) to track the eye position and orientation (for example, by tracking an acceptable correlation from dataset N to N+1, and so forth), as discussed above in relation to FIG. 4. In addition, the resulting "images" are mapped to a trained baseline model, to refine the eye position estimate as sample coverage and density increases.

The eye tracking unit 760 uses the tracked eye movement to determine one or more characterization parameters. A characterization parameter characterizes a function that is based in part on the positions or movements of at least one of the user's eyes. A characterization parameter may be, e.g., an fixation point (where the user is looking), and gaze time (how long the user is looking a particular direction), a vengeance angle (an angle between two eyes when the user changes viewing distance and gaze direction), an interpupillary distance (IPD) of the user, an identification of the user, an eye's torsional state, some other function based on position of one or both eyes, or some combination thereof. In one embodiment, the eye tracking unit 760 may estimate different types of eye movements based on the detected characterization parameters. For example, if the eye tracking unit 760 detects a user looks at a same location for at least a threshold time, the eye tracking unit 760 determines the user's eye fixed on a particular point. If the eye tracking unit 760 detects the user rapidly shifting orientation back and forth between two points of fixation, the eye tracking unit 760 determines the user's eye movement is a saccade (e.g., may occur while reading, thinking, etc.). If the eye tracking unit 760 detects the user shifting orientation regularly for at least a threshold time, the eye tracking unit 760 determines the user' eye movement is smooth pursuit (e.g., following a moving object). Based on the detected eye movement, the eye tracking unit 760 communicates with the console 710 for further processing, as further explained below.

In some embodiments, the eye tracking unit 760 allows a user to interact with content presented to the user by the console 710 based on the detected eye movement. Example interactions by the user with presented content include: selecting a portion of content presented by the console 710 (e.g., selecting an object presented to the user), movement of a cursor or a pointer presented by the console 710, navigating through content presented by the console 710, presenting content to the user based on a gaze location of the user, or any other suitable interaction with content presented to the user.

The imaging device 735 captures image data in accordance with calibration parameters received from the console 710. The image data includes one or more images showing observed positions of the locators 720 that are detectable by the imaging device 735. The imaging device 735 may include one or more cameras, one or more video cameras, any other device capable of capturing images including one or more of the locators 720, or some combination thereof. Additionally, the imaging device 735 may include one or more hardware and software filters (e.g., used to increase signal to noise ratio). The imaging device 735 is configured to detect light emitted or reflected from locators 720 in a field of view of the imaging device 735. In embodiments where the locators 720 include passive elements (e.g., a retroreflector), the imaging device 735 may include a light source that illuminates some or all of the locators 720, which retro-reflect the light towards the light source in the imaging device 735. Image data is communicated from the imaging device 135 to the console 710, and the imaging device 735 receives one or more calibration parameters from the console 710 to adjust one or more imaging parameters (e.g., focal length, focus, frame rate, ISO, sensor temperature, shutter speed, aperture, etc.).

The input interface 740 is a device that allows a user to send action requests to the console 710. An action request is a request to perform a particular action. For example, an action request may be to start or end an application or to perform a particular action within the application. The input interface 740 may include one or more input devices. Example input devices include: a keyboard, a mouse, a game controller, or any other suitable device for receiving action requests and communicating the received action requests to the console 710. An action request received by the input interface 740 is communicated to the console 710, which performs an action corresponding to the action request. In some embodiments, the input interface 740 may provide haptic feedback to the user in accordance with instructions received from the console 710. For example, haptic feedback is provided when an action request is received, or the console 710 communicates instructions to the input interface 740 causing the input interface 740 to generate haptic feedback when the console 710 performs an action.

The console 710 provides content to the HMD 705 for presentation to the user in accordance with information received from one or more of: the imaging device 135, the HMD 705, the input interface 740, and the eye tracking unit 760. In the example shown in FIG. 7, the console 710 includes an application store 745, a tracking module 750, and an engine 755. Some embodiments of the console 710 have different modules than those described in conjunction with FIG. 7. Similarly, the functions further described below may be distributed among components of the console 710 in a different manner than is described here.

The application store 745 stores one or more applications for execution by the console 710. An application is a group of instructions, that when executed by a processor, generates content for presentation to the user. Content generated by an application may be in response to inputs received from the user via movement of the HMD 705, the input interface 140, or the eye tracking unit 760. Examples of applications include: gaming applications, conferencing applications, video playback application, or other suitable applications.

The tracking module 750 calibrates the HMD system 700 using one or more calibration parameters and may adjust one or more calibration parameters to reduce error in determination of the position of the HMD 705. For example, the tracking module 750 adjusts the focus of the imaging device 735 to obtain a more accurate position for observed locators on the HMD 705. Moreover, calibration performed by the tracking module 750 also accounts for information received from the IMU 730. Additionally, if tracking of the HMD 705 is lost (e.g., the imaging device 735 loses line of sight of at least a threshold number of the locators 720), the tracking module 860 re-calibrates some or all of the HMD system 700.

The tracking module 750 tracks movements of the HMD 705 using image data from the imaging device 135. The tracking module 750 determines positions of a reference point of the HMD 705 using observed locators from the image data and a model of the HMD 705. The tracking module 750 also determines positions of a reference point of the HMD 705 using position information from the IMU information. Additionally, in some embodiments, the tracking module 750 may use portions of the IMU information, the image data, or some combination thereof, to predict a future location of the HMD 705. The tracking module 750 provides the estimated or predicted future position of the HMD 705 to the engine 755.

The engine 755 executes applications within the HMD system 700 and receives position information, acceleration information, velocity information, predicted future positions, or some combination thereof of the HMD 705 and eye tracking unit 760 from the tracking module 750. Based on the received information, the engine 755 determines content to provide to the HMD 705 for presentation to the user. For example, if the received information indicates that the user has looked to the left, the engine 755 generates content for the HMD 705 that mirrors the user's movement in a virtual environment. Similarly, if information received from the eye tracking unit 760 indicates the user gazing on a location, the engine 755 generates content based on the identified gazing location, such as a visual representation of the scene at the gazing location with an original display resolution and surrounding scenes with a reduced display resolution. Additionally, in some embodiments, if the received information indicates that tracking of the eye tracking unit 760 is lost, the engine 755 generates content indicating the HMD 705 needs to be adjusted for presentation by the HMD 705. Additionally, the engine 755 performs an action within an application executing on the console 710 in response to an action request received from the Input interface 740, or the eye tracking unit 760 and provides feedback to the user that the action was performed. The provided feedback may be visual or audible feedback via the HMD 705 or haptic feedback via the input interface 740. For example, the Engine 755 receives an action from the eye tracking unit 760 to open an application, so the Engine 755 opens the application and presents content from the application to the user via the HMD 705.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. An eye tracking system comprising:
   an optical coherence tomography (OCT) eye tracking unit configured to determine a first plurality of relative positions of a user's eye over time at a first rate, comprising:
     an illumination source configured to project low coherence interference light onto a portion of the user's eye,
     a detector configured to capture light reflected from the illuminated portion of the user's eye,
     a controller configured to generate, for determining each position of the first plurality of relative positions, an OCT dataset describing the portion of the user's eye based upon the captured light, and determine the relative position of the user's eye based upon an offset between the generated OCT dataset and a previous OCT dataset generated by the OCT eye tracking unit controller describing the portion of the user's eye; and
   a second eye tracking unit comprising a camera configured to capture one or more images of the user's eye, and configured to determine a second plurality of absolute positions of the user's eye in parallel with the OCT eye tracking unit determining the first plurality of relative positions, the second plurality of absolute positions each determined independently and determined at a second rate slower than the first rate at which the OCT eye tracking unit determines the first plurality of relative positions; and wherein the controller of the OCT eye tracking unit is further configured to:

for a first relative position of the first plurality of determined relative positions corresponding to a first time, identify a second absolute position of the second plurality of determined absolute positions corresponding to a second time within a predetermined time period of the first time; and update the determined first relative position based upon a difference between the determined first relative position and the determined second absolute position, wherein the updated first relative position is used by the controller of the OCT eye tracking unit to determine one or more subsequent relative positions of the first plurality of relative positions based on offsets between a generated OCT dataset associated with the first relative position and generated OCT datasets for determining the one or more subsequent relative positions.

2. The eye tracking system of claim 1, wherein the controller is configured to:

periodically update first relative positions of the first plurality of determined relative positions using corresponding second absolute positions of the second plurality of determined absolute positions, based at least in part upon the second rate.

3. The eye tracking system of claim 1, wherein the controller is further configured to:

determine a difference between the determined first relative position and the determined second absolute position; and update the determined first relative position based on the determined difference being at least a threshold value.

4. The eye tracking system of claim 3, wherein the controller is further configured to:

replace the determined first relative position with the determined second absolute position.

5. The eye tracking system of claim 1, wherein the controller is configured to determine the first plurality of relative positions of the user's eye based upon a trained baseline model of an eye.

6. The eye tracking system of claim 5, wherein the controller is further configured to:

update the trained baseline model based upon a difference between the determined first relative position and the determined second absolute position.

7. The eye tracking system of claim 1, wherein the second plurality of absolute positions of the user's eye are determined based upon the one or more images captured by the camera of the second eye tracking unit.

8. The eye tracking system of claim 1, wherein the OCT eye tracking unit further comprises:

a beam splitter configured to divide the projected coherent light comprises a first portion projected towards a reference mirror, and a second portion illuminating the portion of the user's eye, wherein a position of the reference mirror is selected based upon a desired axial position of the illuminated portion of the user's eye, and wherein the detector is configured to capture the first portion of the projected coherent light reflected by the reference mirror and the second portion of light reflected from the illuminated portion of the user's eye.

9. The eye tracking system of claim 1, wherein the eye tracking system is part of a head-mounted display (HMD).

10. The eye tracking system of claim 1, wherein the OCT eye tracking unit and the second eye tracking unit are part of a head-mounted display (HMID).

11. A method, comprising:

determining, at an optical coherence tomography (OCT) eye tracking unit, a first plurality of relative positions of a user's eye over time at a first rate, by:

projecting, using an illumination source, low coherence interference light onto a portion of a user's eye;

capturing, via a detector, light reflected from the illuminated portion of the user's eye;

for determining each position of the first plurality of relative positions, generating an OCT dataset describing the portion of the user's eye based upon the captured light, and determining the relative position of the user's eye based upon an offset between the OCT dataset generated by the OCT eye tracking unit and a previous OCT dataset generated by the OCT eye tracking unit describing the portion of the user's eye;

determining, via a second eye tracking unit comprising a camera configured to capture one or more images of the user's eye, a second plurality of absolute positions of the user's eye in parallel with the OCT eye tracking unit determining the first plurality of relative positions, the second plurality of absolute positions each determined independently and determined at a second rate slower than the first rate at which the OCT eye tracking unit determines the first plurality of relative positions; and for a first relative position of the first plurality of determined positions corresponding to a first time, identifying a second absolute position of the second plurality of determined absolute positions corresponding to a second time within a predetermined time period of the first time; and updating the determined first relative position based upon a difference between the determined first relative position and the determined second absolute position, wherein the updated first relative position is used by the OCT eye tracking unit to determine one or more subsequent relative positions of the first plurality of relative positions based on offsets between a generated OCT dataset associated with the first relative position and generated OCT datasets for determining the one or more subsequent relative positions.

12. The method of claim 11, further comprising:

periodically updating first relative positions of the first plurality of determined relative positions using corresponding second absolute positions of the second plurality of determined absolute positions, based at least in part upon the second rate.

13. The method of claim 11, further comprising:

determining a difference between the determined first relative position and the determined second absolute position; and updating the determined first relative position based on the determined difference being at least a threshold value.

14. The method of claim 11, further comprising replacing the determined first relative position with the determined second absolute position.

15. The method of claim 11, further comprising determining the first plurality of relative positions of the user's eye based upon a trained baseline model of an eye.

16. The method of claim 15, further comprising updating the trained baseline model based upon a difference between the determined first relative position and the determined second absolute position.

17. The method of claim 11, further comprising determining the second plurality of absolute positions of the user's eye based upon the one or more images captured by the camera of the second eye tracking unit.

18. The method of claim 11, wherein the OCT eye tracking unit comprises:
 a beam splitter configured to divide the projected coherent light comprises a first portion projected towards a reference mirror, and a second portion illuminating the portion of the user's eye,
 wherein a position of the reference mirror is selected based upon a desired axial position of the illuminated portion of the user's eye, and
 wherein the detector is configured to capture the first portion of the projected coherent light reflected by the reference mirror and the second portion of light reflected from the illuminated portion of the user's eye.

19. A non-transitory computer readable storage medium storing instructions, the instructions when executed by a processor cause the processor to:
 determine, at an optical coherence tomography (OCT) eye tracking unit, a first plurality of relative positions of a user's eye over time at a first rate, by:
  projecting, using an illumination source, low coherence interference light onto a portion of a user's eye;
  capturing, via a detector, light reflected from the illuminated portion of the user's eye;
  for determining each position of the first plurality of relative positions, generating an OCT dataset describing the portion of the user's eye based upon the captured light, and determining the relative position of the user's eye based upon an offset between the OCT dataset generated by the OCT eye tracking unit and a previous OCT dataset generated by the OCT eye tracking unit describing the portion of the user's eye;
 determine, via a second eye tracking unit comprising a camera configured to capture one or more images of the user's eye, a second plurality of absolute positions of the user's eye in parallel with the OCT eye tracking unit determining the first plurality of relative positions, the second plurality of absolute positions each determined independently and determined at a second rate slower than the first rate at which the OCT eye tracking unit determines the first plurality of relative positions; and
 for a first relative position of the first plurality of determined positions corresponding to a first time, identify a second absolute position of the second plurality of determined absolute positions corresponding to a second time within a predetermined time period of the first time; and
 update the determined first relative position based upon a difference between the determined first relative position and the determined second absolute position, wherein the updated first relative position is used by the OCT eye tracking unit to determine one or more subsequent relative positions of the first plurality of relative positions based on offsets between a generated OCT dataset associated with the first relative position and generated OCT datasets for determining the one or more subsequent relative positions.

* * * * *

UNITED STATES PATENT AND TRADEMARK OFFICE
CERTIFICATE OF CORRECTION

PATENT NO. : 10,963,046 B1
APPLICATION NO. : 15/982896
DATED : March 30, 2021
INVENTOR(S) : Robert Dale Cavin et al.

Page 1 of 1

It is certified that error appears in the above-identified patent and that said Letters Patent is hereby corrected as shown below:

In the Claims

In Column 22, Claim 10, Line 9, delete "(HMID)" and insert -- (HMD). --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*